United States Patent
Okada et al.

(10) Patent No.: US 9,623,508 B2
(45) Date of Patent: Apr. 18, 2017

(54) WELDING METHOD

(71) Applicants: IHI Infrastructure Systems Co., Ltd., Osaka (JP); IHI Corporation, Tokyo (JP)

(72) Inventors: Seiji Okada, Osaka (JP); Kazuya Ueda, Osaka (JP); Akihiro Yamanouchi, Osaka (JP); Koutarou Inose, Tokyo (JP)

(73) Assignees: IHI Infrastructure Systems Co., Ltd., Osaka (JP); IHI Corporation, Tokyo (JP)

( * ) Notice: Subject to any disclaimer, the term of this patent is extended or adjusted under 35 U.S.C. 154(b) by 323 days.

(21) Appl. No.: 14/383,481

(22) PCT Filed: Apr. 3, 2013

(86) PCT No.: PCT/JP2013/002322
§ 371 (c)(1),
(2) Date: Sep. 5, 2014

(87) PCT Pub. No.: WO2013/150793
PCT Pub. Date: Oct. 10, 2013

(65) Prior Publication Data
US 2015/0048055 A1    Feb. 19, 2015

(30) Foreign Application Priority Data

Apr. 5, 2012 (JP) .................................. 2012-086827

(51) Int. Cl.
*B23K 9/00* (2006.01)
*B23K 35/38* (2006.01)
(Continued)

(52) U.S. Cl.
CPC ............ *B23K 9/173* (2013.01); *B23K 9/0026* (2013.01); *B23K 9/23* (2013.01); *B23K 35/0255* (2013.01);
(Continued)

(58) Field of Classification Search
CPC ........ B23K 9/0026; B23K 9/02; B23K 9/173; B23K 9/23; B23K 35/0255;
(Continued)

(56) References Cited

U.S. PATENT DOCUMENTS 4,125,758 A * 11/1978 Oishi .................. B23K 9/0209
219/126
4,803,340 A * 2/1989 Sato .................. B23K 35/3602
219/145.23
5,686,002 A    11/1997 Flood et al.

FOREIGN PATENT DOCUMENTS

JP    S63157764 A    6/1988
JP    1-91993 A    4/1989
(Continued)

OTHER PUBLICATIONS

European Patent Office, Extended European Search Report for Application No. 13772079.3, Oct. 7, 2015, 6 pages, Germany.
(Continued)

*Primary Examiner* — Dana Ross
*Assistant Examiner* — Lindsey C Staubach
(74) *Attorney, Agent, or Firm* — Alston & Bird LLP

(57) ABSTRACT

A welding method wherein the root gap aperture displacement is measured before welding begins, and a welding material having a Mn/S ratio and a Mn/Si ratio compatible with the measured root gap aperture displacement is selected from gas-shielded arc welding materials. Gas-shielded arc welding is then performed using the selected welding material.

3 Claims, 5 Drawing Sheets

(51) Int. Cl.
  *B23K 15/00* (2006.01)
  *B23K 9/23* (2006.01)
  *B23K 35/30* (2006.01)
  *B23K 35/36* (2006.01)
  *B23K 9/173* (2006.01)
  *B23K 35/02* (2006.01)
  *B23K 103/04* (2006.01)

(52) U.S. Cl.
  CPC ...... *B23K 35/0261* (2013.01); *B23K 35/0294* (2013.01); *B23K 35/3026* (2013.01); *B23K 35/3073* (2013.01); *B23K 2203/04* (2013.01)

(58) Field of Classification Search
  CPC ............ B23K 35/0261; B23K 35/0294; B23K 35/3026; B23K 35/3073
  USPC ........ 219/74, 121.13, 121.14, 121.3, 121.32, 219/121.33, 124.22, 136, 137 R, 219/137 WM, 137.2, 146.1
  See application file for complete search history.

(56) References Cited

FOREIGN PATENT DOCUMENTS

| | | |
|---|---|---|
| JP | 5-305476 A | 11/1993 |
| JP | 6-170539 A | 6/1994 |
| JP | 2000042785 A | 2/2000 |
| JP | 2001-293595 A | 10/2001 |
| JP | 2003-126959 A | 5/2003 |
| JP | 2009-202201 A | 9/2009 |

OTHER PUBLICATIONS

International Searching Authority, International Search Report for International Application No. PCT/JP2013/002322, Jul. 9, 2013, 5 pages, Japanese Patent Office, Japan.

* cited by examiner

FIG.1

| ELECTRODE \ ELEMENT | C | Si | Mn | P | S | Mn/S | Mn/Si |
|---|---|---|---|---|---|---|---|
| 1 | 0.04 | 0.43 | 0.06 | 0.008 | 0.005 | 12 | 0.1 |
| 2 | 0.07 | 0.45 | 1.48 | 0.009 | 0.009 | 164 | 3.3 |
| 3 | 0.03 | 0.53 | 0.59 | 0.011 | 0.006 | 98 | 1.1 |
| 4 | 0.04 | 0.74 | 0.56 | 0.009 | 0.003 | 187 | 0.8 |
| 5 | 0.04 | 0.57 | 0.63 | 0.006 | 0.005 | 126 | 1.1 |
| 6 | 0.08 | 0.37 | 1.25 | 0.012 | 0.003 | 417 | 3.2 |
| 7 | 0.06 | 0.42 | 0.98 | 0.009 | 0.003 | 327 | 2.3 |
| 8 | 0.06 | 0.52 | 1.44 | 0.007 | 0.009 | 160 | 2.8 |
| 9 | 0.06 | 0.52 | 1.10 | 0.014 | 0.007 | 157 | 2.1 |
| 10 | 0.04 | 0.34 | 1.28 | 0.010 | 0.003 | 427 | 3.8 |
| 11 | 0.03 | 0.39 | 1.38 | 0.007 | 0.004 | 345 | 3.5 |
| 12 | 0.03 | 0.38 | 1.71 | 0.009 | 0.004 | 428 | 4.5 |
| 13 | 0.04 | 0.59 | 1.49 | 0.010 | 0.003 | 497 | 2.5 |
| 14 | 0.04 | 0.22 | 1.13 | 0.008 | 0.003 | 377 | 5.1 |
| 15 | 0.05 | 0.19 | 1.19 | 0.008 | 0.003 | 397 | 6.3 |
| 16 | 0.05 | 0.21 | 1.22 | 0.009 | 0.003 | 407 | 5.8 |
| 17 | 0.05 | 0.13 | 1.16 | 0.007 | 0.002 | 580 | 8.9 |
| 18 | 0.05 | 0.10 | 1.08 | 0.006 | 0.002 | 540 | 10.8 |
| 19 | 0.03 | 0.22 | 1.44 | 0.008 | 0.001 | 1440 | 6.5 |

FIG.4

| ELEMENT | C | Si | Mn | P | S | Mn/S | Mn/Si |
|---|---|---|---|---|---|---|---|
| WELDING CONSUMABLE A | 0.05 | 0.43 | 1.28 | 0.013 | 0.008 | 160 | 2.98 |
| WELDING CONSUMABLE B | 0.05 | 0.05 | 1.30 | 0.015 | 0.010 | 130 | 26 |

FIG.5

| | ROOT OPENING G(mm) | ROOT OPENING WIDTH VARIATION $\Delta \delta$ (mm) | DISCONTINUITY |
|---|---|---|---|
| WELDING CONSUMABLE A(1) | 4 | 0.2 | NO |
| WELDING CONSUMABLE A(2) | 10 | 0.2 | NO |
| WELDING CONSUMABLE A(3) | 4 | 0.3 | NO |
| WELDING CONSUMABLE A(4) | 10 | 0.3 | YES |
| WELDING CONSUMABLE A(5) | 4 | 0.4 | NO |
| WELDING CONSUMABLE A(6) | 10 | 0.4 | YES |
| WELDING CONSUMABLE B(1) | 4 | 0.2 | NO |
| WELDING CONSUMABLE B(2) | 10 | 0.2 | YES |

WELDING METHOD

CROSS REFERENCE TO RELATED APPLICATIONS

This application is a national stage application, filed under 35 U.S.C. §371, of International Application No. PCT/JP2013/002322, filed Apr. 3, 2013, which claims priority to Japanese Application No. 2012-086827, filed Apr. 5, 2012, the contents of both of which being hereby incorporated by reference in their entirety.

BACKGROUND

Technical Field

The technique disclosed herein relates to a gas shielded metal arc welding method for use in, for example, butt welding of steel plates.

Description of Related Art

In recent years, an increase in traffic volume or an increase in vehicle weight has caused damage to already-existing bridges, and the already-existing bridges, therefore, have been repaired or reinforced. To address such an increase in traffic volume or such an increase in vehicle weight, the functionality of the bridges has been enhanced. For example, the width of each bridge (the number of lanes) has been increased, or such bridges have been upgraded from second-class bridges (accommodating cars that can carry a load of 14 tons) to first-class bridges (accommodating cars that can carry a load of 20 tons).

Typically, a bridge cannot be carried to a factory, and various works described above are, therefore, executed at the site of the bridge. If the bridge is closed to execute the works, a need exists for executing the works only during the night during which the traffic volume is relatively low or for allowing vehicles to run in at least one of lanes to reduce the influence of the closure of the bridge on communities or the economy. As a result, problems, such as lack of time for executing the works, the securement of the safety of operators, or the influence of the works on residents living in the vicinity of the bridge (e.g., noise), have become more significant.

To address such problems, there has been an increasing demand for executing the works while the bridge is in service without closing the bridge. When the works are executed while the bridge is in service as described above, examples of a process for bonding steel plates include weld connecting and high strength bolted connection, and conventionally, high strength bolted connection has been principally used for bridges. The reason for this has been considered to be that since vehicles running on a bridge in service vibrate the bridge, and displace bevels, welding under such conditions prevents the reliability of weld joints from being secured.

FIG. 7 illustrates how a vehicle runs on a steel plate deck girder bridge. A portion of the bridge illustrated in FIG. 7 includes a left lane block 11 and right lane blocks 12 and 13. The left lane block 11 is weld-bonded to each of the right lane blocks 12 and 13, and the right lane blocks 12 and 13 are weld-bonded to each other. Here, when a vehicle 15 runs on the left lane block 11, welded joints are vibrated, and bevels are displaced.

However, even in the case of high strength bolted connection, when the works are executed under a load and vibration conditions, the mechanical performance of a joint is not always clear. Comparison between weld connecting and high strength bolted connection shows that as seen from these bonding processes, weld connecting provides a simpler structure, a higher degree of flexibility, and better bonding efficiency. For this reason, if in-service welding can be performed, weld connecting is significantly advantageous. Thus, for example, PATENT DOCUMENT 1 proposes an in-service welding method.

PATENT DOCUMENT 1, as referenced herein, refers to Japanese Unexamined Patent Publication No. H06-170539.

BRIEF SUMMARY

The welding method proposed in PATENT DOCUMENT 1 is based on welding such as shielded metal-arc welding using electrodes. When such welding is used to weld, for example, such steel plate deck girders as illustrated in FIG. 7, many electrodes are required to form a welded joint that is continuous over a long distance. This impairs the working efficiency. Every time an electrode is renewed, operation is temporarily suspended, and the operation is, therefore, discontinuously performed. This increases the risk of a discontinuity in the welded joint.

In contrast to this, gas shielded arc welding has been known as an efficient welding process. In the gas shielded arc welding, an arc spot is gas-shielded to perform welding. In the gas shielded arc welding, not an electrode, such as a shielded metal-arc electrode, but a welding consumable, such as a wire, is used. When the electrode is used, the distance over which a single welding operation is performed is short. In contrast, when the welding consumable is used, the distance over which a single welding operation is performed is substantially unlimited. Thus, a welded joint that is continuous over a long distance can be formed without suspending operation.

Unfortunately, the difference in welding mechanism between the shielded metal-arc welding and the gas shielded arc welding prevents the characteristics of a welded joint to be formed from being identical even if chemical compositions of welding consumables for both the welding processes are identical to each other. For this reason, the welding method proposed in PATENT DOCUMENT 1 cannot be applied to in-service gas shielded arc welding without being changed.

It is therefore an object of the present invention to permit in-service gas shielded arc welding to thereby enable the efficient formation of a strong welded joint that is continuous over a long distance.

In order to achieve the object, a welding method according to an embodiment of the present invention is directed to a method for performing welding under fluctuating stress. The method includes: measuring a root opening width variation before start of welding; and selecting a welding consumable having Mn/S and Mn/Si ratios accommodating the measured root opening width variation from among gas shielded arc welding consumables.

According to the welding method of the embodiment of the present invention, the Mn/S and Mn/Si ratios in the welding consumable are determined based on the measurement result of the root opening width variation before the start of welding. This enables selection of a welding consumable that is adequately resistant to a crack under assumed fluctuating stress. This selection enables in-service gas shielded arc welding, and a strong welded joint that is continuous over a long distance can be, therefore, efficiently formed.

In the welding method of the embodiment of the present invention, when a root opening width variation during welding is measured, and the measured root opening width variation exceeds an allowable value assumed to select the welding consumable, quality of a welded joint formed at a time when the measured root opening width variation exceeds the allowable value may be inspected.

Thus, also when the root opening width variation exceeds the allowable value during a welding operation at the site of welding, and the quality of a welded joint is deteriorated, a deteriorated portion of the welded joint is identified, and the welded joint can be, therefore, easily inspected and repaired (if necessary).

In the welding method of the embodiment of the present invention, the welding consumable may be selected based on a root opening.

This enables selection of a more appropriate welding consumable in consideration of the root opening itself in addition to the measured root opening width variation before the start of welding.

The welding method of the embodiment of the present invention enables in-service gas shielded arc welding, and a strong welded joint that is continuous over a long distance can be, therefore, efficiently formed.

BRIEF DESCRIPTION OF THE FIGURES

FIG. 1 illustrates chemical compositions of target electrodes for a trans-varestraint test conducted by the applicants of this application.

FIG. 4 illustrates chemical compositions of welding consumables for use in the welding test illustrated in FIGS. 3(a) and 3(b).

FIG. 5 illustrates the results of conducting the welding test illustrated in FIGS. 3(a) and 3(b) using the welding consumables illustrated in FIG. 4.

DETAILED DESCRIPTION OF VARIOUS EMBODIMENTS

The applicants of this application examined the resistance of each of a plurality of electrodes (φ4 mm) to a crack formed by imposing strain on the electrode using a trans-varestraint test. The electrodes have such various chemical compositions (unit: weight percent (wt. %)) as illustrated in FIG. 1. The examination showed that the Mn/Si and Mn/S ratios in each electrode significantly affect the crack resistance.

Figure 2:
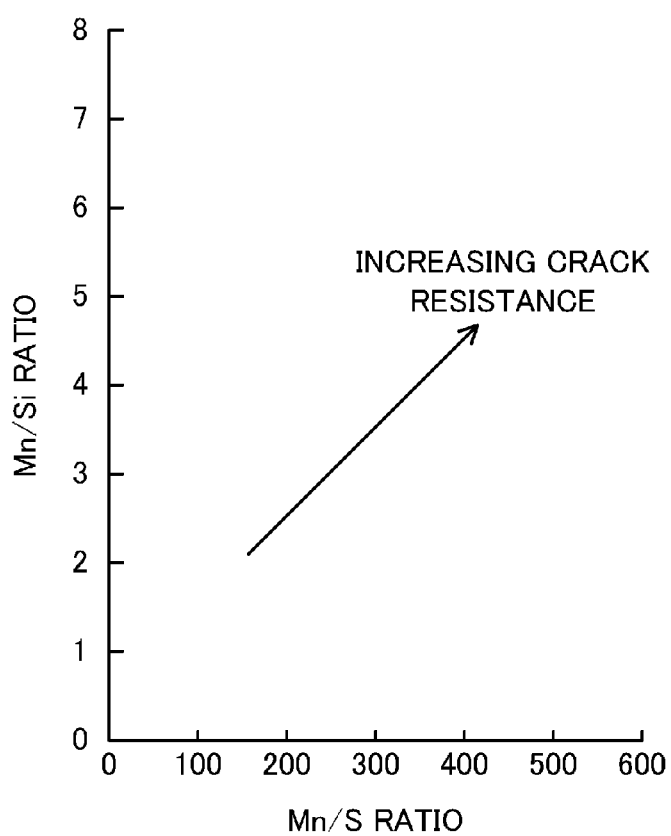
FIG. 2 illustrates the relationship between each of the ratio of manganese (Mn) to sulfur (S) in an electrode and the ratio of Mn to silicon (Si) therein and the crack resistance, which was shown by the trans-varestraint test conducted by the applicants of this application.

Specifically, it was recognized that as illustrated in FIG. 2, with increasing Mn/S and Mn/Si ratios in an electrode, the crack resistance under fluctuating load increases.

In view of the foregoing, to examine the applicability of in-service gas shielded arc welding, the inventors of this application used welding consumables having different Mn/S ratios and different Mn/Si ratios (specifically, gas shielded arc welding consumables, such as wires, used to perform a single welding operation over a longer distance than when electrodes, such as shielded metal-arc electrodes, are used) to conduct a welding test while varying the root opening (G) and the root opening width variation (Δδ), i.e., the amount by which the width of the root opening varies.

Figure 3A:
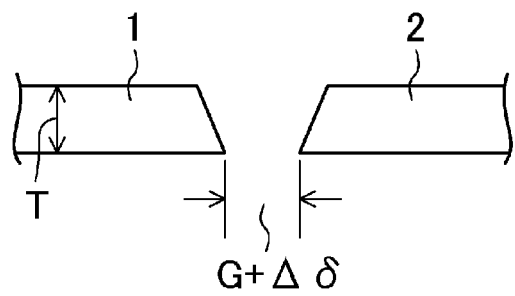
FIGS. 3(a) and 3(b) illustrate the state of a test for examining the applicability of in-service gas shielded arc welding. The test was conducted by the inventors of this application.
Figure 3B:
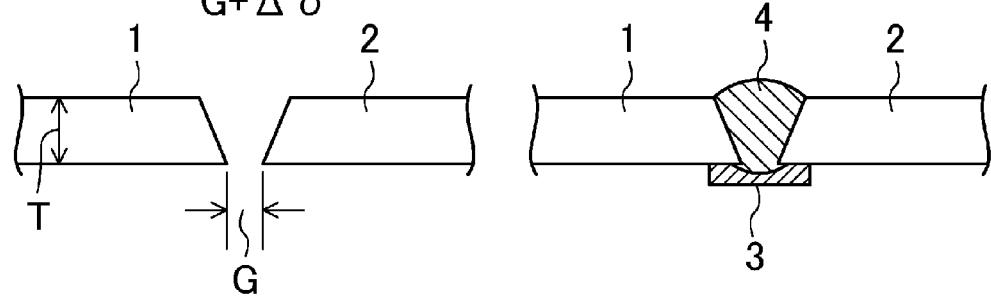

Specifically, as illustrated in FIG. 3(a), substrates 1 and 2 each having a thickness T faced each other with the root opening G therebetween, a backing member 3 was provided at the bottom of a groove defined between bevels of the substrates 1 and 2 as illustrated in FIG. 3(b), and gas shielded arc welding was performed using carbonic acid gas to form a welded joint 4, thereby bonding the substrates 1 and 2 together.

A welding consumable A (Mn/S ratio=160, Mn/Si ratio=2.98) and a welding consumable B (Mn/S ratio=130, Mn/Si ratio=26) each having a corresponding one of the chemical compositions illustrated in FIG. 4 was used as welding consumables.

A rolled steel SM490A having a thickness T of 16 mm was used as each of the substrates 1 and 2. The root opening G was selected from two different values, i.e., 4 mm and 10 mm, and when each value was selected as the root opening G, the root opening width variation (Δδ) (before welding) was selected from among three different values, i.e., 0.2 mm, 0.3 mm, and 0.4 mm. Thus, a welding test was conducted. The substrates 1 and 2 were displaced using servomechanisms retaining portions of the substrates 1 and 2 opposite to the bevels, and the root opening width variation (Δδ) was measured with a displacement gauge, thereby allowing the root opening width variation to be equal to the above-described selected value. In this welding test, the frequency of variation in width of the root opening was set at 3.7 Hz, which is close to the frequency of vibrations induced by a running vehicle.

FIG. 5 illustrates results of the welding test in which the above-described welding consumables were used. Here, the results were obtained by examining whether a discontinuity, such as a crack or a porosity, is caused in a welded joint through an ultrasonic test (UT) and a radiograph test (RT). A crack in an end portion of the welded joint can be prevented by the provision of an end tab, and thus, was not considered as a discontinuity.

As illustrated in FIG. 5, in a case where the welding consumable A was used, when the root opening G was 4 mm, which is a typical value, a discontinuity was not caused even in a situation where the root opening width variation Δδ was 0.4 mm, which is relatively large. Also when the root opening G was set at 10 mm in consideration of an adequate margin for operation, and the root opening width variation Δδ was 0.2 mm, substrates were able to be welded using the welding consumable A without any discontinuity.

In contrast, in a case where the welding consumable B was used, when the root opening G was 4 mm, any discontinuity was not caused in a situation where the root opening width variation Δδ was 0.2 mm. However, when the root opening G was 10 mm, a discontinuity was caused in a situation where the root opening width variation Δδ was 0.2 mm.

Based on the above-described results of the welding test, the inventors of this application found that if the root opening width variation Δδ before the start of welding is measured, and a welding consumable having a Mn/S ratio and a Mn/Si ratio accommodating the measurement result is selected from among shielded metal-arc welding consumables each used to perform a single welding operation over a longer distance than when a shielded metal-arc electrode is used, gas shielded arc welding can be performed under fluctuating stress. The inventors of this application also found that if the root opening width variation Δδ is measured also during an actual welding operation at the site of welding, and the measured root opening width variation Δδ exceeds an allowable value assumed when a welding consumable was selected, the quality of a welded joint formed at the time when the measured root opening width variation Δδ exceeds the allowable value is inspected (through visual inspection, an ultrasonic test (UT), a radiograph test (RT), or any other test) to identify a deteriorated portion of the welded joint, and the welded joint can be, therefore, easily inspected and repaired (if necessary). Furthermore, the inventors of this application found that if, to select a welding consumable, not only the measured root opening width variation Δδ before the start of welding but also the root opening itself is taken into consideration, a more appropriate welding consumable can be selected.

A welding method according to an embodiment of the present invention will now be described with reference to the drawings. The welding method according to this embodiment is an in-service gas shielded arc welding method (i.e., under fluctuating stress), and the gas shielded arc welding method is based on the findings described in the above-described section "Assumptions of the Present Invention."

Figure 6:
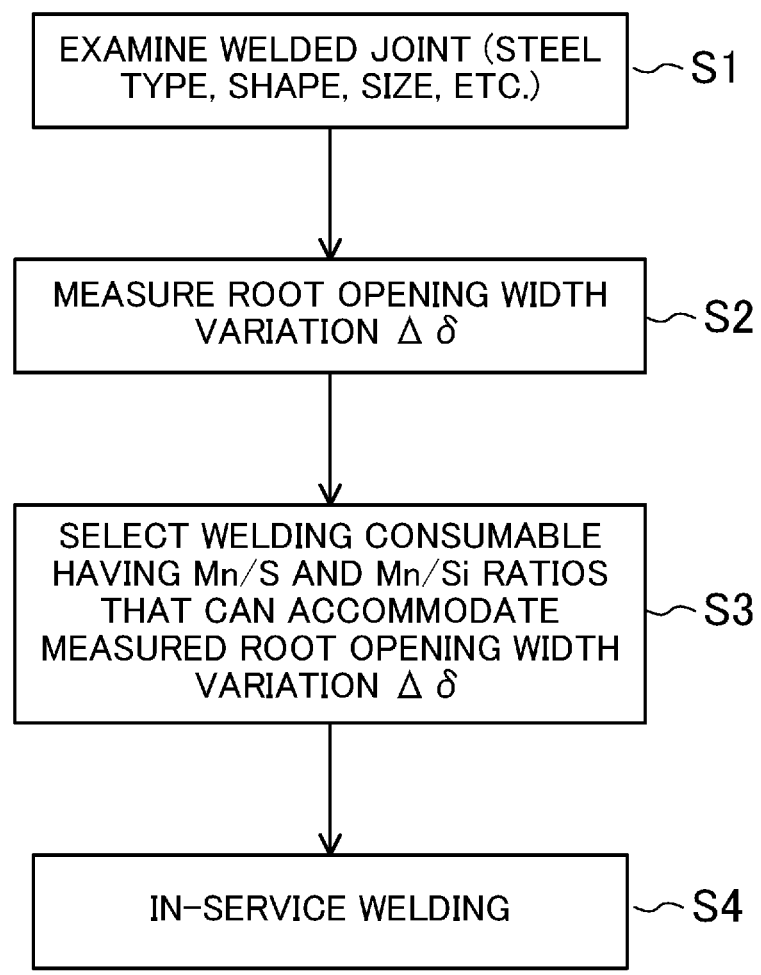
FIG. 6 is a flow chart of a welding method according to an embodiment.
Figure 7:
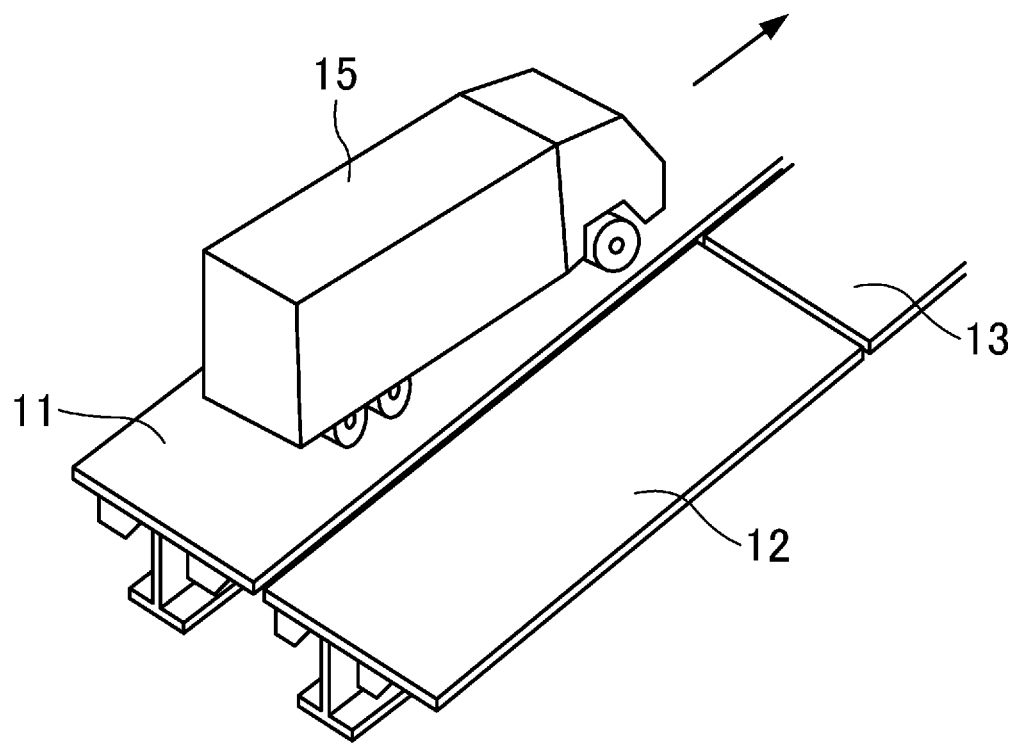
FIG. 7 illustrates how a vehicle runs on a steel plate deck girder bridge.

FIG. 6 is a flow chart of the welding method according to this embodiment.

First, in step S1, for example, the steel grade, shape, and size of a target joint for welding are examined based on, for example, a construction plan.

Next, in step S2, to form the joint examined in step S1, the root opening width variation Δδ (before welding) under service conditions is measured.

Next, in step S3, a welding consumable having Mn/S and Mn/Si ratios that can accommodate the root opening width variation Δδ measured in step S2 (a gas shielded arc welding consumable, such as a wire, used to perform a single welding operation over a longer distance than when an electrode, such as a shielded metal-arc electrode, is used) is selected. Specifically, a maximum root opening width variation Δδ (an allowable root opening width variation) is determined based on the measurement result of the root opening width variation Δδ, and a welding consumable having Mn/S and Mn/Si ratios that allow the welding consumable to be adequately resistant to a crack also when the root opening width variation Δδ is equal to the allowable root opening width variation is selected.

For example, in a case where the root opening G is determined in, for example, a construction plan to be equal to or less than 4 mm, if the allowable root opening width variation is 0.2 mm, either of the above-described welding consumables A and B can be used, whereas if the allowable root opening width variation is 0.4 mm, the above-described welding consumable A can be used. Alternatively, if the allowable root opening width variation exceeds 0.4 mm, a welding consumable that is adequately resistant to a crack in a situation where the root opening width variation Δδ is equal to the allowable root opening width variation, i.e., a welding consumable having higher Mn/S and Mn/Si ratios than those of the above-described welding consumable A, needs to be selected.

When the root opening G can be optionally determined, a welding consumable is selected also in consideration of the root opening G. For example, when the allowable root opening width variation is 0.2 mm, and the root opening G is set at 4 mm, either of the above-described welding consumables A and B can be used, whereas when the allowable root opening width variation is similarly 0.2 mm, and the root opening G is set at 10 mm, the above-described welding consumable A can be used.

Next, in step S4, the welding consumable selected in step S3 is used to weld the target joint for welding by gas shielded arc welding.

As described above, according to this embodiment, the Mn/S ratio and the Mn/Si ratio of the welding consumable are determined based on the measurement result of the root opening width variation Δδ before the start of welding. This enables selection of a welding consumable that is adequately resistant to a crack under assumed fluctuating stress. This selection enables in-service gas shielded arc welding, and a strong welded joint that is continuous over a long distance can be, therefore, efficiently formed.

In this embodiment, if the root opening width variation Δδ is measured during the time period during which gas shielded arc welding is performed in step S4, and the measured root opening width variation Δδ exceeds the allowable root opening width variation assumed to select the welding consumable, the quality of a welded joint formed at the time when the measured root opening width variation Δδ exceeds the allowable root opening width variation may be inspected. Thus, also when the root opening width variation Δδ exceeds the allowable root opening width variation during a welding operation at the site of welding to deteriorate the quality of a welded joint, a deteriorated portion of the welded joint can be easily identified and repaired.

In this embodiment, for example, when the measurement result of the root opening width variation Δδ in step S2 shows that the allowable root opening width variation exceeds 0.4 mm, and selectable welding consumables include only a consumable that is resistant to a crack in a situation where the allowable root opening width variation is equal to or less than 0.4 mm, the following procedure may be performed. Specifically, for example, the provision of a constraining plate or traffic regulation reduces the root opening width variation Δδ, and thereafter, the root opening width variation Δδ is again measured in step S2. Subsequently, for example, the constraint and how traffic is regulated have been successively tightened until the allowable root opening width variation is equal to or less than 0.4 mm. Here, when the root opening G is variable, the root opening G may be reduced.

In this embodiment, for example, the type of the target joint for welding and the type and thickness of steel forming the joint are not specifically limited. For example, steel having a strength substantially equivalent to or less than that of SM490A, such as SM400A, SM400B, SM490B, SM490YA, or SM490YB in Japanese industrial standards (JIS) G 3106, may be used for butt welding. The steel has a thickness of equal to or less than 16 mm.

In this embodiment, the Mn/S and Mn/Si ratios of the welding consumable for use in gas shielded arc welding are not specifically limited. However, with increasing Mn/S and Mn/Si ratios, the resistance of the welding consumable to a crack under strain increases, whereas with increasing amount of Mn contained in the welding consumable, the cost required for the consumable increases, and the viscosity of a droplet during welding increases, resulting in difficulty in, for example, ensuring the uniformity of the welded joint. Thus, the use of a welding consumable having a low Mn/S ratio and a low Mn/Si ratio that can accommodate the measurement result of the root opening width variation Δδ before the start of welding is advantageous in, for example, cost and ease of operation. Applicants' studies on the electrodes having the chemical compositions illustrated in FIG. 1 show that the amount of each of C, Si, P, and S in the welding consumable is preferably as small as possible.

In this embodiment, the type of a shielding gas for use in gas shielded arc welding is also not specifically limited. However, with increasing content of an inert gas (e.g., Ar) in the shielding gas, the amount of spatters, for example, decreases, whereas with increasing content of the inert gas, the cost required for the shielding gas increases.

Incidentally, when multilayer welding is performed in a in-service welding operation, a first layer is most likely to be cracked, whereas when a second layer and layers following the second layer are to be formed, the root opening width variation $\Delta\delta$ significantly decreases. Thus, when multilayer welding is performed, gas shielded arc welding of this embodiment may be performed to form all layers. Alternatively, gas shielded arc welding of this embodiment may be performed only to form a first layer. In other words, a welding consumable having lower Mn/S and Mn/Si ratios than those of the first layer may be used to form the second layer and the layers following the second layer.

A target to which the welding method of this embodiment is applied is not limited to a bridge demanding an in-service welding operation. If the welding method of this embodiment is applied also to, for example, other steel structures undergoing fluctuating stress arising from an external environment, such as a steel tower or an offshore structure, the welding method of this embodiment is highly effective.

The present invention is useful as a gas shielded arc welding method for use in butt welding of, for example, steel plates.

The invention claimed is:

1. A method for performing welding under fluctuating stress, the method comprising:

measuring a first root opening width variation for a predetermined period of time before start of welding;

setting a maximum value of the measured first root opening width variation as an allowable value;

selecting, from among gas shielded arc welding consumables, a welding consumable having Mn/S and Mn/Si ratios configured such that the selected welding consumable is adequately crack resistant when the measured first root opening width variation is equal to the allowable value;

measuring a second root opening width variation while welding is performed;

if the second root opening width variation exceeds the allowable value, inspecting, after welding, a quality of only a welded joint formed at a time when the second root opening width variation was measured as exceeding the allowable value; and if the quality of the welded joint inspected differs relative to a predetermined value, repairing the welded joint.

2. The method of claim 1, wherein if none of the gas shielded arc welding consumables have the Mn/S and Mn/Si ratios configured to be adequately crack resistant when the measured first root opening width variation is equal to the allowable value, the welding consumable is selected with a reduced root opening.

3. The method of claim 1, wherein:

the selected welding consumable is a first welding consumable for use in a first layer; and a second welding consumable having lower Mn/S and Mn/Si ratios than the first welding consumable is used to perform welding to form a second and subsequent layers.

* * * * *